United States Patent [19]
Leib

[11] Patent Number: 6,016,232
[45] Date of Patent: Jan. 18, 2000

[54] HEAT CONDUCTING LASER RESISTANT STRUCTURES

[75] Inventor: Kenneth G. Leib, Wantagh, N.Y.

[73] Assignee: Northrop Grumman Corporation, Los Angeles, Calif.

[21] Appl. No.: 05/526,603

[22] Filed: Nov. 22, 1974

[51] Int. Cl.$^7$ .................................. G02F 1/36; G02B 5/30
[52] U.S. Cl. ........................... 359/886; 359/887; 359/890
[58] Field of Search ...................................... 250/510, 514, 250/515, 517; 343/18 A, 18 E; 350/168, 267, 321, 276; 428/112, 913; 109/29; 219/121 L, 121 LM; 244/121, 117 A, 129 W; 102/105; 89/36 A; 165/47

[56] References Cited

U.S. PATENT DOCUMENTS

| B 527,669 | 1/1976 | Poulsen | 350/160 |
|---|---|---|---|
| 3,267,807 | 8/1966 | Swope et al. | 89/36 A |
| 3,344,434 | 10/1967 | Beckmann et al. | 350/267 |
| 3,410,502 | 11/1968 | Leadon et al. | 102/105 |
| 3,435,186 | 3/1969 | Roshon et al. | 219/121 CM |
| 3,492,062 | 1/1970 | Hoover | 350/312 |
| 3,648,056 | 3/1972 | Buttweiler et al. | 350/276 SL |

FOREIGN PATENT DOCUMENTS

| 1208213 | 10/1970 | United Kingdom | 350/312 |
|---|---|---|---|

OTHER PUBLICATIONS

De Mert, "Directed Energy Weapons", Aug. 1962, pp. 92–96, Electronics Industries.

Spencer et al., "1R Laser Radiation Eye Protector", Oct. 1974 pp. 1545–1546, Rev. Sci. Inst, vol. 43, #10.

"Radiation Goggles", Aug. 30, 1965, Aviation Week Space Technology, vol. 83, #9, p. 97.

*Primary Examiner*—Nelson Moskowitz
*Attorney, Agent, or Firm*—Terry J. Anderson; Karl J. Hoch, Jr.

[57] ABSTRACT

A multi-layer structure for controlling the destructive effects of laser radiation including means within the structure for conducting the heat generated in the outer layer by the incident laser radiation away from the outer layer to achieve significant mitigation of the destructive effects of the laser radiation in a transparent structure.

21 Claims, 3 Drawing Sheets

HEAT CONDUCTING LASER RESISTANT STRUCTURES

BACKGROUND

The present invention relates to a multi-layer structure for controlling the transmission of laser radiation, and more specifically to a multi-layer structure wherein heat generated in the outer layer by incident laser radiation is conducted away from the outer layer to mitigate significantly the destructive effects of the laser radiation. This invention may be used in such structures as aircraft canopies and windshields, helmets and glasses.

The following co-pending applications by the same Applicant are related to the present application:

1. "Partially Ablating Laser Resistant Structures", Ser. No. 526,602, filed simultaneously with the present application;
2. "Beam Scattering Laser Resistant Structures", Ser. No. 526,604, filed simultaneously with the present application; and
3. "Absorbent Laser Resistant Structure", Ser. No. 526,605, filed simultaneously with the present application.

In recent years there has been considerable interest in, and a growing development of, lasers whose output optical radiation is of a high intensity. By optical radiation as used herein is meant any portion of the electromagnetic spectrum between about 0.4 and about 15.0 micrometers, and is not confined to the visible portion of the spectrum. Already, considerable effort has been directed toward the development of communication systems utilizing lasers while further technical development is being directed toward the use of a laser as a weapon against aircraft.

Many recent optical devices are fabricated with glass, glass laminates, plastics and plastic laminates to achieve various effects under sunlight or artificial light conditions. Several of these devices have been designed with the idea that light will be diminished as it passes through the device. Many modern applications require these devices to transmit light in the visible portion of the spectrum but diminish light from high intensity laser radiation.

To date, laser weapons have two practical threat wavelengths:

1) approximately 10 micrometers (infrared); and,
2) the range 3 to 5 micrometers.

Depending upon the material exposed to the incident laser beam, the energy from each of these threat wavelengths will either be absorbed by or transmitted through the layer of material in the structure. In general, however, plastics will be absorbing to the 10 micrometer laser although some will transmit in the 3–5 micrometer range. Thus, based upon intelligence reports, different structures and/or materials will be employed according to which laser wavelength is anticipated.

Aircraft canopies and windscreens have generally been designed for aerodynamic and economic reasons rather than for laser weapon protection. They are constructed to incorporate the following characteristics:

a) Aerodynamic compatibility with the shape factor of the aircraft;
b) Structural soundness under prescribed aerodynamic environments;
c) Good visibility (transparency in the visible portion of the spectrum); and
d) Ease of fabrication.

However, in view of the developments in laser technology, it is now desirable that aircraft canopies and windscreens also:

e) be capable of withstanding laser radiation for a sufficient time (e.g. t>1 second) to enable the pilot to assume a change in aircraft attitude;
f) be aerodynamically sound to enable the pilot to carry out his assigned mission and/or return to his home base after having been exposed to some maximum level of radiation;
g) to reduce the on-axis level of radiation transmitted, thereby lowering the level of exposure to the pilot.

SUMMARY OF THE INVENTION

It is therefore an object of the present invention to provide laser resistant structures for attenuating high energy laser radiation.

It is another object of the present invention to provide laser resistant structures having improved heat resistant and absorption properties.

A further object of the present invention is to provide laminated structures having variable light transmission properties.

A still further object of the present invention is to provide a laminated laser resistant structure for protection in a high intensity laser radiation environment.

A still further object of the present invention is to provide a laminated structure for protection in a high intensity laser radiation environment in which the wavelength of the radiation is altered.

Other objects, aspects, and advantages of the present invention will be apparent when the detailed description is considered with the drawing.

A laser resistant structure is provided for aircraft windscreens or canopies which is capable of furnishing an aerodynamically functional form and also mitigating the effect of incident laser radiation. The reduced effectiveness of the laser beam affords a pilot the time to assume a defensive attitude or an offensive posture. Further protection for the pilot and/or aircraft crew can be realized by providing these personnel with improved safety glasses and/or helmets which, in conjunction with the improved canopy and/or windscreen, would extend aircraft capability through increased pilot protection. The principle of operation of the devices according to the present invention emanates from conducting the heat generated in the outer layer from exposure to a laser beam to mitigate substantially the destructive effects of the laser beam.

According to the present invention, the destructive effects of incident laser radiation are significantly reduced by conducting the heat generated in the outer layer exposed to laser radiation by heat conducting monofilaments embedded throughout the structure and by a liquid filled structure whereby heat is carried away by the liquid.

DETAILED DESCRIPTION OF THE PREFERRED EMBODIMENTS

Figure 1A:
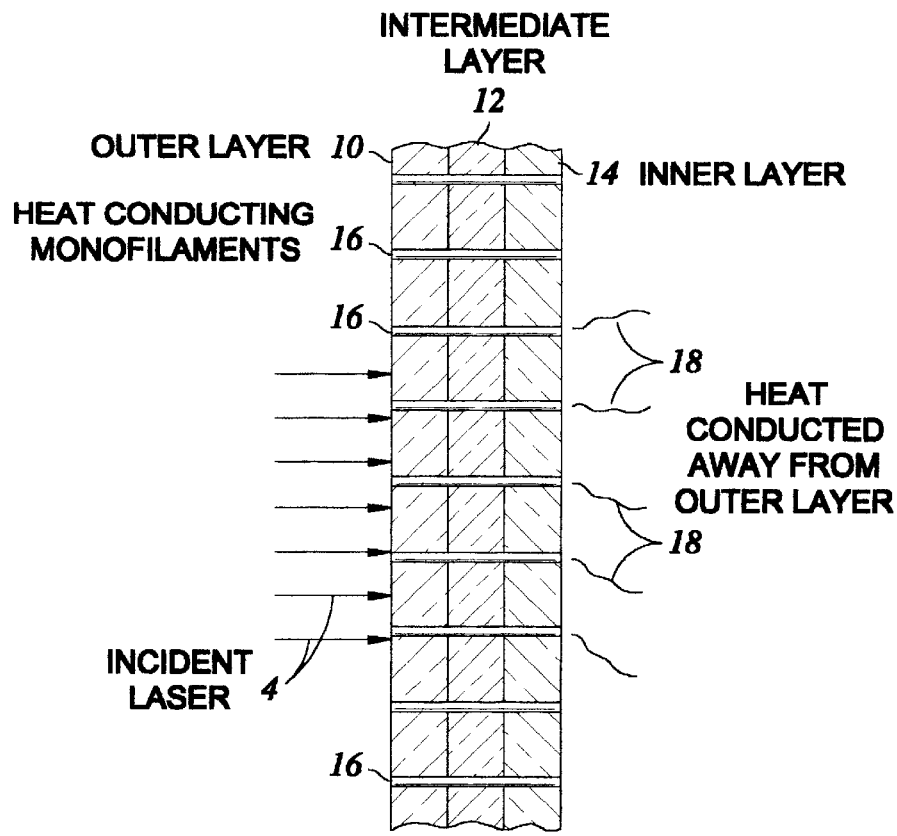
FIGS. 1a and 1b are side and front views respectively of the conductive filament form of the light transmission attenuation device according to the present invention.
Figure 1B:
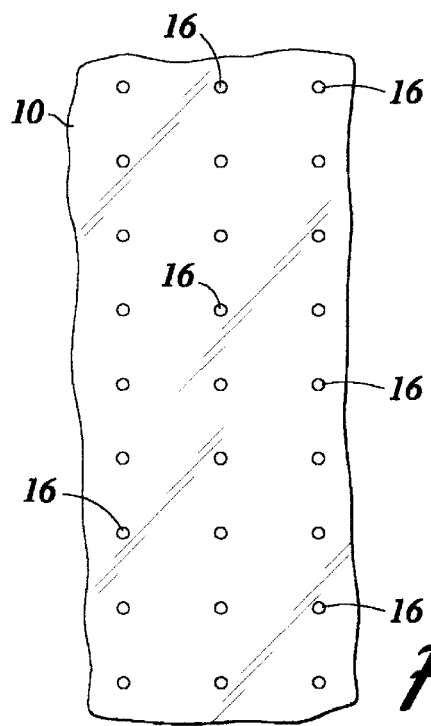

Referring now to FIG. 1, the laser resistant structure includes an outer layer 10, an inner layer 14 and an intermediate layer 12. Layer 10 has a high coefficient of absorption, α, for the wavelengths of laser radiation. Dispersed throughout the laminate structure are small filaments 16 whose length is perpendicular to the contiguous surfaces of the layers 10, 12 and 14. The array of individual fibers 16 may be uniformly spaced to maintain overall structural uniformity. Each filament is constructed of a high thermally conductive material having a much lower ablation rate than the host materials. Examples include silver, gold or copper. The cross-sectional area of these monofilaments constitutes approximately one-one hundredth of each unit surface area.

When high intensity laser radiation, 4, is incident upon layer 10, a destructive thermal force is imposed because of the high absorbtivity of the lamina with a subsequent thermal degradation of the material. The incident radiation develops thermal gradients in the layers. Heat is thereby transferred to the monofilament fibers which conduct this heat toward the cooler side of the structure as indicated by 18 in FIG. 1a. Heat generated by radiation directly incident upon the conducting filaments is conducted away from the incident surface either directly along the fiber or by evaporation of the fiber. Thus, due to the lower ablation rate of the conducting filaments, the effective ablation rate of the composite will be reduced. Advantageously, the coefficients of absorption for the intermediate and inner layers are also high so that the composite is characterized by the reduced effective ablation rate throughout the structure.

Since the object of the filaments is to increase the thermal capacity of the composite, and yet maintain visible spectrum transparency, the cross-sectional area of the filaments should be minimized. It is preferable to have a multiplicity of small diameter filaments rather than a few large diameter filaments even though both would maintain the same average optical transmission. This preference arises because the heat absorbing surface increases directly as the radius of the filaments and the cross-sectional area increases as the square of the radius. Thus, the ratio of thermal absorption area to fiber cross-sectional area will depend upon the ratio (2/r), dictating small filaments. Other factors such as problems in fabrication may ultimately limit the size to which the fibers can be reduced.

Figure 2A:
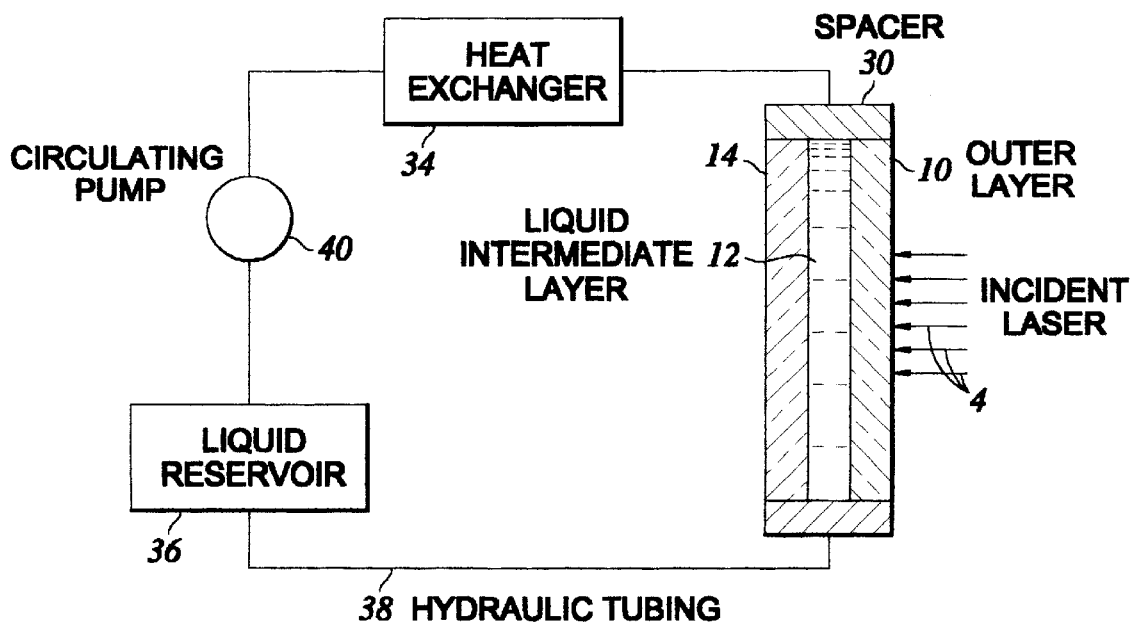
FIGS. 2a, 2b and 2c illustrate the liquid cell form of the light transmission attenuation device according to the present invention.

Referring now to FIG. 2, the heat conducting laser resistant structure can take the form of a liquid filled structure. The properties of the layers and the liquid may be in one of many combinations depending upon the wavelength $\lambda_o$ or wavelengths of the incident high intensity laser radiation. Consider FIG. 2a, the three layer structure in which the inner and outer layers, 14 and 10 respectively, form a container or cell for the liquid intermediate layer, 12. The spacing between these two layers is comparable to that normally occupied by a solid inner laminae. The liquid in the spacing can be employed in an ambient or at rest condition, under static pressure, or used in a flowing or circulating, closed cycle system.

FIG. 2a depicts the inner and outer layers 14 and 10 which transmit light in the visible portion of the spectrum and which are held apart by some convenient means. One example of which is schematically shown as 30 in the figure, is a form of plate to which the two laminae 10 and 14 are attached. The support 30 is provided with means whereby a liquid may be introduced between the layers. The space between the laminae is filled with a liquid, or a mixture of liquids whose resultant index of refraction is close to or equal to the index of refraction of the two solid laminae in the visible portion of the electromagnetic spectrum.

In one illustrative configuration, shown in FIG. 2a, the liquid or liquid mixture 12 is highly absorbing to the incident radiation while the outer panel or layer 10 is not absorbing at the wavelength $\lambda_o$ of the incident laser radiation, the liquid in the cell absorbs the incident radiation thereby setting up circulating currents carrying heat away from the region of the incident beam 32. This reduces the thermal effect of the absorbed incident beam. Examples of liquids found appropriate for use in this embodiment include ethylene glycol for the 3 to 5 micron range for anticipated laser wavelengths or a mixture of water and ethylene glycol for lasers at about 5 microns and water for lasers of 10 micron wavelength.

In another embodiment of the present invention, reservoir 36, circulating pump 40, heat exchanger 34 and hydraulic piping 38 may be utilized to form a circulating system. When the high intensity laser radiation, 4, is incident upon layer 10 as shown, the radiation generates heat either in layer 10, if it is absorbing at that wavelength, or directly in the liquid 12 if the liquid is absorptive at that wavelength and outer layer 10 is either substantially transmissive or partially absorptive at that wavelength. Heat is therefore either transferred to the liquid from layer 10 or generated directly in the liquid and is thereafter conducted by the hydraulic tubing 38 to the heat exchanger 34 where the heat is removed, and then to reservoir 36 where the circulating process is repeated. The circulating pump, 40, provides rapid circulation in the system to meet the demands of the heat generated by the incident laser beam. When the outer layer is designed to be absorbing to the anticipated threat laser wavelength, the liquid should be a highly efficient heat conducting liquid such as water so that heat is rapidly removed from the outer layer to avoid substantial damage to the outer layer before evasive action should have been executed.

Figure 2B:
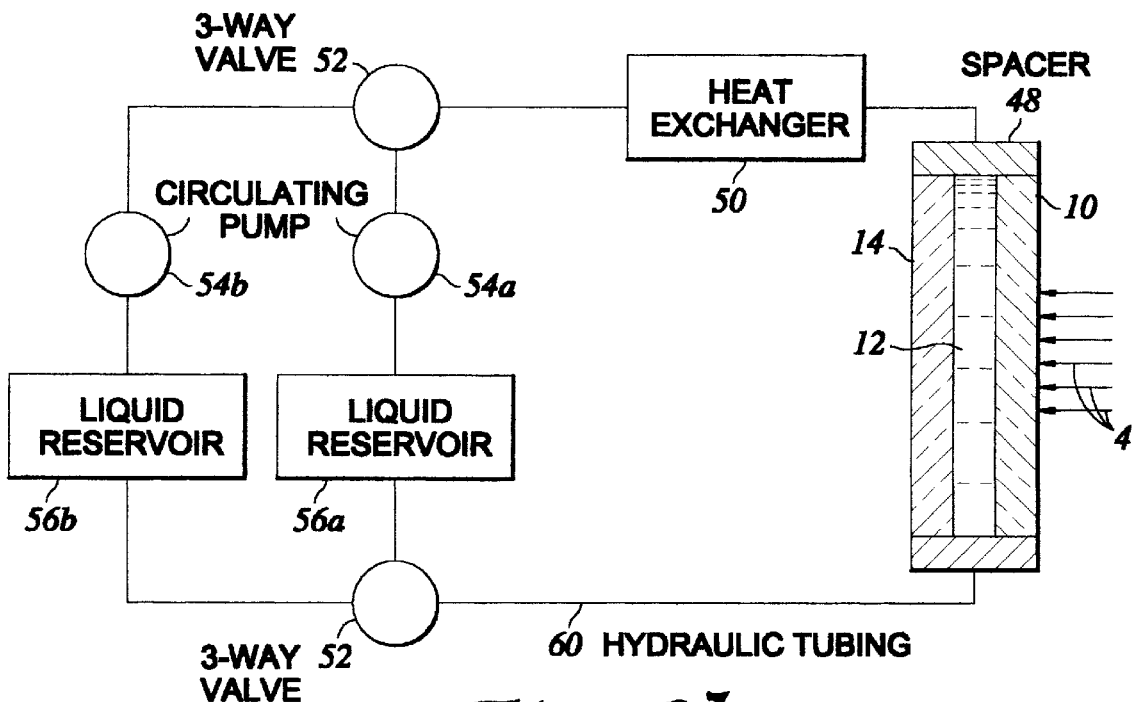

If the wavelength of the high intensity laser radiation encountered in combat conditions is different from that originally anticipated, the absorption at the new wavelength may not be the same as that at the old, and in fact may be significantly different. FIG. 2b shows an embodiment of the present invention which overcomes this problem. The structure comprises an outer layer, 10, and an inner layer, 14, which are held apart by some convenient means, 48, so as to permit easy passage of liquid between them. Liquid reservoirs, 56a, 56b, etc., are paired up with pumping means, 54a, 54b, etc., each pair being connected in parallel by hydraulic piping, 60, and three-way valves, 52. Heat exchanger, 50, is provided to remove heat absorbed by the liquid. The liquid in each reservoir is selected for its absorptive characteristics at the different wavelengths of threat laser radiation.

In operation, high intensity laser radiation, 4, is incident on the outer layer, 10. The laser beam is transmitted through the outer layer to the intermediate layer, 12, of liquid. According to the wavelength of the incident laser radiation, the three-way valves, 52, can be activated either manually or by electronic controls, to permit the appropriate liquid, absorptive at that wavelength, to circulate as the intermediate layer. The liquid will thereby absorb the energy of the incident laser as heat which raises the temperature of the liquid. The circulating pump associated with the selected liquid directs the liquid to heat exchanger, 50, which removes the heat from the liquid. Continuous circulation of the liquid allows effective operation and attenuates the effects of incident radiation to allow ample time for evasive action. Thus, a number, N, of liquids can be utilized with N identical arrangements of circulating pumps and reservoirs, 2(N−1) three-way valves and either a common heat exchanger or a combination of heat exchangers.

Figure 2C:
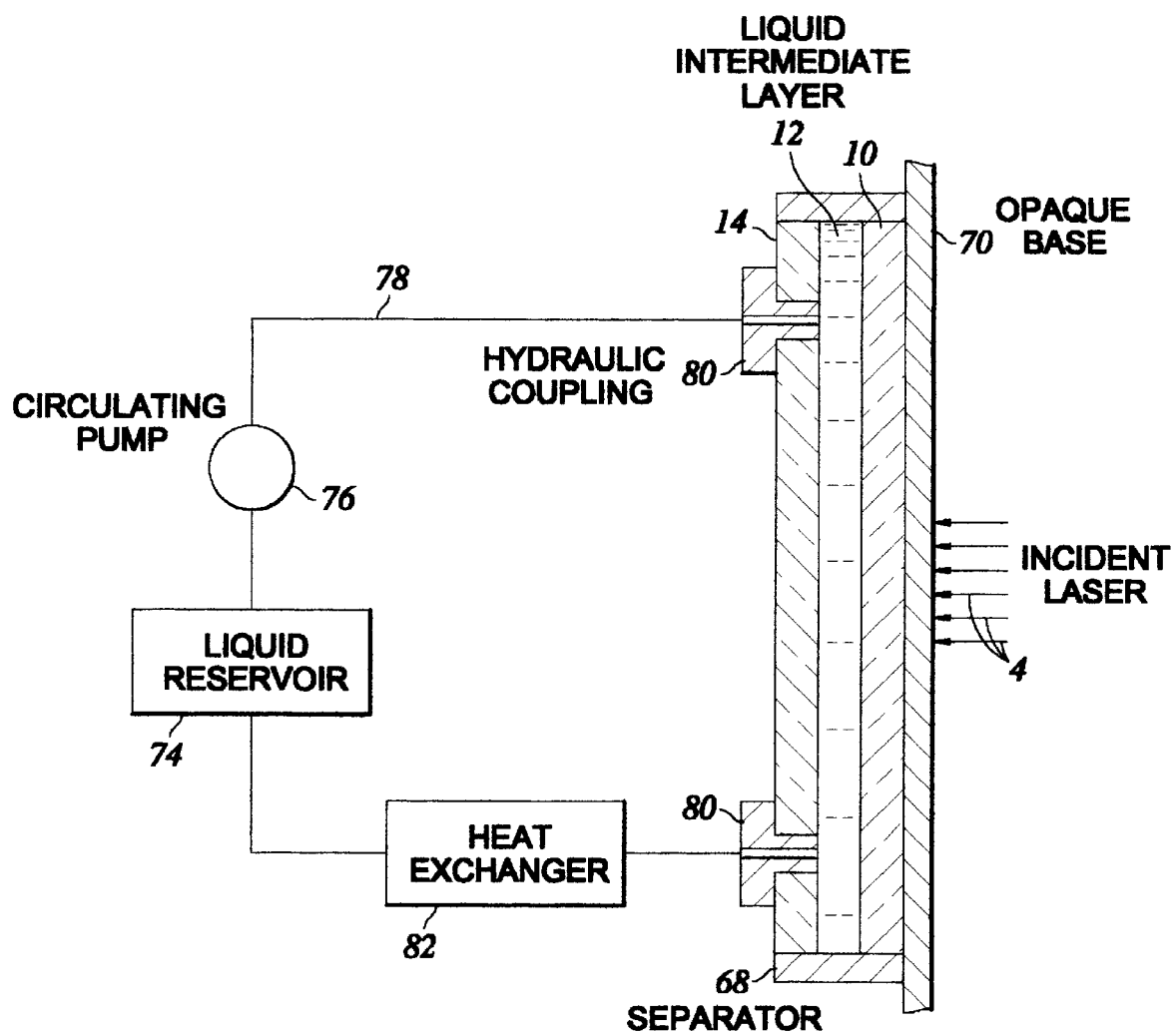

Referring now to FIG. 2c, which shows the opaque base form of the light transmission attenuation device, a multilaminae structure of one or more forms such as those described with reference to FIG. 2a or 2b is attached directly to an opaque base material such as aluminum, titanium or boron filament composite which would typically form the skin of an aircraft. The three-layer structure consists of outer and inner layers 10, 14 respectively and means 68 for maintaining them spaced apart so that a liquid, 12, may be injected between them. A liquid or liquid mixture is stored in a reservoir 74. The liquid is permitted to circulate in a continuous manner between laminae 10 and 14 by means of a circulating pump 76, hydraulic tubing 78 and hydraulic coupling 80. In the practical application of this invention, layer 10 may be acrylic and either attached to the opaque base panel 70 by means of a suitable adhesive, or it may be constructed of a material capable of being cast in place directly to the panel, or pre-fabricated to the panel before the panel 70 is installed into place.

In a particularly effective configuration, layer 10 may be eliminated all together and the separator, 68, can therefore be directly attached to the panel 70 with a liquid tight seal. Thus, the opaque base becomes the outer layer.

When high intensity laser radiation, 4, is incident upon the panel 70, which in a typical application of this invention would be aluminum, titanium or a boron filament composite, the panel will absorb a certain amount of the radiation as heat. The lamina 10 if present, will conduct the heat to the liquid layer 12 which is part of the circulating system so that the heat is carried away to the heat exchanger 82 and the liquid returned to the reservoir 74. When layer 10 is not present, the heat induced in panel 70 will be directly transferred to the liquid where it will be carried away and removed as described above. According to the latter approach, the transfer of heat from the panel 70 to the liquid will be more efficient.

A particularly useful advantage to the liquid cell heat conducting laser resistant structure is that when incident high intensity laser radiation is sufficiently high, the thermal diffusivity of the outer panel, whether transparent or opaque, may be inadequate and the thermal heat generated in the panel may not be readily carried to the circulating liquid. In this case, the outer panel may melt or ablate creating a hole in the region of high beam intensity. When the hole is effected, the liquid will be forced out directly into the path of the beam. This will enable the liquid to absorb the radiation for the period of time during which the pump can supply liquid from the reservoir substantially as described in co-pending application entitled "Partially Ablating Laser Resistant Structures," Ser. No. 05/526,602, filed Nov. 22, 1974. In this modification of the invention, the equipment or other devices behind the panel and laminate assembly do not experience the full intensity of the incident beam and ample time is therefore afforded to permit evasive action.

It should be understood that the embodiments shown are only exemplary and that various modifications can be made in construction and arrangement within the scope and spirit of the invention as defined in the appended claims.

What is claimed is:

1. A multi-layer laser resistant structure comprising:

a generally opaque outer layer;

an intermediate layer of ethylene glycol;

an inner layer;

means for maintaining said inner and outer layers a generally fixed distance apart to form a space for containing said liquid;

means for hermetically sealing the space between said inner and outer layers;

hydraulic tubing coupled to said space, said tubing forming a generally circuitous conduit with said cell;

a reservoir of said liquid connected to said hydraulic tubing;

circulating pump means connected to said tubing; and a heat exchanger connected to said tubing, such that said liquid will be circulated by said pump in said space to absorb heat generated in said outer layer by laser radiation incident thereon, said heat exchanger extracting heat transferred to said liquid to significantly mitigate effects of incident laser radiation on said outer layer.

2. A multi-layer laser resistant structure comprising:

an outer layer;

an intermediate layer;

an inner layer; and a plurality of thermally conductive monofilament fibers embedded in said layers generally perpendicular to the surfaces thereof, said outer, inner and intermediate layers having substantially equal indices of refraction in the visible portion of the electromagnetic spectrum and said outer layer being generally absorptive to incident laser radiation, such that said thermally conductive monofilament fibers conduct heat generated in said outer layer due to the incidence of the laser radiation away from said outer layer to substantially mitigate any damage to said structure due to the incidence of the laser radiation.

3. A multi-layer laser resistant structure comprising:

an outer layer;

an inner layer;

means for maintaining said inner and outer layers a fixed distance apart;

means for substantially hermetically sealing the space between said inner and outer layers;

at least two reservoirs of generally heat conductive liquid, each liquid being substantially absorptive to a predetermined band of wavelengths of laser radiation, said reservoirs being connected in parallel to the spacing between the outer and inner layers by hydraulic tubing to form a substantially closed cooling system;

a circulating pump and a heat exchanger coupled by said hydraulic tubing to said closed cooling system, for constantly circulating liquid between said inner and outer layers and through said heat exchanger for removing any heat from the liquid; and at least one pair of three-way valves, the number of said three-way valves being less than the number of said liquid reservoirs, said three-way valves being controllable to permit introduction of any of the liquids in said reservoirs into said closed cooling systems, said inner and outer layers and said liquids having substantially equal indices of refraction in the visible portion of the electromagnetic spectrum, such that liquid can be selected for circulating between said inner and outer layers to conduct heat generated in said outer layer due to the incidence of laser radiation on said outer layer away from said outer layer and to said heat exchanger to substantially mitigate any damage to the structure due to the incidence of laser radiation.

4. A multi-layer laser resistant structure comprising:

an outer layer, said outer layer being partially absorptive to a predetermined band of wavelengths of laser radiation;

an inner layer;

means for maintaining said inner and outer layers a fixed distance apart;

means for substantially hermetically sealing the space between said inner and outer layers;

a generally heat conductive liquid contained in the space between said inner and outer layers, said liquid being at least partially absorptive to the predetermined band of wavelengths;

a reservoir of said liquid coupled to the space between said inner and outer layers by hydraulic tubing;

a heat exchanger coupled to the space between said inner and outer layers; and circulating pump means coupled to the space between said inner and outer layers, said reservoir, said heat exchanger and said pump means providing a closed circulating coolant system with said space, such that energy associated with laser radiation incident on said outer layer is partially absorbed by both said outer layer and said liquid and heat generated in the outer layer due to the incidence of laser radiation is conducted away from said outer layer by liquid circulating in said space to said heat exchanger for substantially mitigating damage to said outer layer caused by the incidence of generally high intensity laser radiation, while laser radiation of a band of wavelengths different from the predetermined band can be absorbed by said outer layer.

5. A multi-layer laser resistant structure comprising:

an outer layer, said outer layer being partially absorptive to a predetermined band of wavelengths of laser radiation;

an inner layer;

means for maintaining said inner and outer layers a fixed distance apart;

means for substantially hermetically sealing the space between said inner and outer layers; and liquid substantially filling the space between said inner and outer layers, said liquid being substantially absorptive to the predetermined band of wavelengths, such that energy associated with incident laser radiation is partially absorbed by both said outer layer and said liquid, while laser radiation at a band of wavelengths different from the predetermined band of wavelengths can be absorbed by said outer layer, and such that circulating currents are set up in said liquid to carry away heat from the region of incidence of the laser radiation to substantially mitigate damage to said outer layer due to the incidence of laser radiation.

6. A multi-layer laser resistant structure comprising:

a generally opaque outer layer;

an intermediate layer of a mixture of water and ethyelene glycol;

an inner layer;

means for maintaining said inner and outer layers a generally fixed distance apart to form a space for containing said liquid;

means for hermetically sealing the space between said inner and outer layers;

hydraulic tubing coupled to said space, said tubing forming a generally circuitous conduit with said cell;

a reservoir of said liquid connected to said hydraulic tubing;

circulating pump means coupled to said tubing; and a heat exchanger connected to said tubing, such that said liquid can be circulated by said pump means in said space to absorb heat generated in said outer layer by laser radiation incident thereon, said heat exchanger extracting heat transferred to said liquid to significantly mitigate effects of incident laser radiation on said outer layer.

7. A multi-layer laser resistant structure comprising:

an outer layer;

an inner layer;

means for maintaining said inner and outer layers a generally fixed distance apart;

means for substantially hermetically sealing the space between said inner and outer layers; and ethylene glycol liquid substantially filling the space between said inner and outer layers;

such that energy associated with laser radiation incident on said outer layer is absorbed by said liquid and circulating currents are set up in said liquid to carry away heat from the region of incidence of the laser radiation to substantially mitigate damage to said outer layer due to the incidence of laser radiation.

8. A multi-layer laser resistant structure consisting of:

an outer layer;

an inner layer;

means for maintaining said inner and outer layers a generally fixed distance apart;

means for substantially hermetically sealing the space between said inner and outer layers; and a liquid mixture of water and ethyelen glycol substantially filling the space between said inner and outer layers, such that energy associated with laser radiation incident on said outer layer is absorbed by said liquid and circulating currents are set up in said liquid to carry away heat from the region of incidence of the laser radiation to substantially mitigate damage to said outer layer due to the incidence of laser radiation.

9. A multi-layer laser resistant structure consisting of:

a generally opaque outer layer;

an intermediate layer of generally heat conductive liquid;

an inner layer;

means for maintaining said inner and outer layers a generally fixed distance apart to form a space for containing said liquid;

means for hermetically sealing the space between said inner and outer layers;

hydraulic tubing coupled to said space, said tubing forming a generally circuitous conduit with said cell;

a reservoir of said liquid connected to said hydraulic tubing;

circulating pump means coupled to said tubing; and a heat exchanger coupled to said tubing, such that said liquid can be circulated by said pump means in said space to absorb heat generated in said outer layer by laser radiation incident thereon, said heat exchanger extracting heat transferred to said liquid to significantly mitigate effects of incident laser radiation on said outer layer.

10. A multi-layer laser resistant structure consisting of:

an outer layer;

an inner layer;

means for maintaining said inner and outer layers a generally fixed distance apart;

means for substantially hermetically sealing the space between said inner and outer layers;

a generally heat conductive liquid contained in the space between said inner and outer layers;

a reservoir of said liquid coupled to the space between said inner and outer layers by hydraulic tubing;

a heat exchanger coupled to the space between said inner and outer layers;

circulating pump means coupled to the space between said inner and outer layers; and, conduit means coupling said reservoir, said heat exchanger and said pump means to said space for providing a closed circulating coolant system with said space, such that heat generated in said outer layer due to the incidence of laser radiation is conducted away from said outer layer by the liquid circulating in said space to said heat exchanger for substantially mitigating damage to said outer layer caused by the incidence of generally high intensity laser radiation.

11. A multi-layer laser resistant structure consisting of:

an outer layer;

an inner layer;

means for maintaining said inner and outer layers a generally fixed distance apart;

means for substantially hermetically sealing the space between said inner and outer layers; and liquid substantially filling the space between said inner and outer layers, said liquid being substantially absorptive to a predetermined band of wavelengths of laser radiation, such that energy associated with laser radiation incident on said outer layer is absorbed by said liquid and circulating currents are set up in said liquid to carry away heat from the region of incidence of the laser radiation to substantially mitigate damage to said outer layer due to the incidence of laser radiation.

12. A laser resistant structure according to claim 11, wherein said inner and outer layers and said liquid have substantially equal indices of refraction in the visible portion of the electromagnetic spectrum.

13. The laser resistant structure according to claim 12 wherein said outer layer is substantially absorptive to the predetermined band of wavelengths of laser radiation, such that at least a substantial portion of the energy associated with incident laser radiation is absorbed by said outer layer.

14. The laser resistant structure in accordance with claim 2 wherein the cross-sectional area of said monofilament fibers constitutes $\frac{1}{100}$ of each unit of area of the surface area of the outer layer.

15. The laser resistant structure in accordance with claim 2, wherein said monofilament fiber material is selected from the group consisting of gold, silver and copper.

16. The laser resistant structure in accordance with claim 4, wherein said inner, and outer layers and said liquid have substantially equal indices of refraction in the visible portion of the electromagnetic spectrum.

17. The multi-layer laser resistant structure according to claim 9 wherein said outer opaque layer is the outer skin of an aircraft.

18. A laser resistant structure according to claim 11 wherein said outer layer is substantially transmissive to the predetermined band of wavelengths, such that essentially all the energy associated with the incident laser radiation is absorbed by said liquid.

19. A laser resistant structure according to claim 11 wherein said outer layer is partially absorptive to the predetermined band of wavelengths, such that energy associated with the incident laser radiation is partially absorbed by both said outer layer and said liquid, while laser radiation at a wavelength different from the predetermined band of wavelengths can be absorbed by said outer layer.

20. A laser resistant structure according to claim 11 wherein said liquid is ethylene glycol.

21. A laser resistant structure according to claim 11 wherein said liquid is a mixture of water and ethylene glycol.

* * * * *